United States Patent
David et al.

(10) Patent No.: US 7,922,205 B2
(45) Date of Patent: Apr. 12, 2011

(54) BOOSTER SEAT EQUIPPED WITH A SEATBELT ADAPTOR

(76) Inventors: Arnon David, Ramat Hasharon (IL); Yair David, Ramat Hasharon (IL); Doron David, Gea (IL); Yael David, Be'er Sheva (IL)

( * ) Notice: Subject to any disclaimer, the term of this patent is extended or adjusted under 35 U.S.C. 154(b) by 144 days.

(21) Appl. No.: 12/430,137

(22) Filed: Apr. 27, 2009

(65) Prior Publication Data

US 2009/0261565 A1    Oct. 22, 2009

Related U.S. Application Data

(63) Continuation-in-part of application No. 11/560,864, filed as application No. PCT/IL2005/001174 on Nov. 17, 2006, now Pat. No. 7,533,901.

(60) Provisional application No. 60/685,398, filed on May 31, 2005.

(51) Int. Cl.
*B60R 22/30* (2006.01)

(52) U.S. Cl. ................................ 280/801.1; 297/468

(58) Field of Classification Search ............... 24/579.11; 280/801.1, 808; 297/250.1, 468, 483, 485
See application file for complete search history.

(56) References Cited

U.S. PATENT DOCUMENTS

| | | |
|---|---|---|
| 4,291,915 A | 9/1981 | Cox |
| 4,645,231 A | 2/1987 | Takada |
| 4,966,393 A | 10/1990 | Tokugawa |
| 5,121,527 A | 6/1992 | Righi |
| 5,248,187 A | 9/1993 | Harrison |
| D352,591 S | 11/1994 | Laney |
| 5,381,590 A | 1/1995 | Liou et al. |
| 5,507,558 A | 4/1996 | Kain |
| 5,570,933 A | 11/1996 | Rouhana et al. |
| 5,596,312 A | 1/1997 | Fowler et al. |
| D393,337 S | 4/1998 | Seki |
| 5,788,282 A | 8/1998 | Lewis |
| 5,795,030 A | 8/1998 | Becker |
| 6,343,841 B1 | 2/2002 | Gregg et al. |
| 6,481,750 B1 | 11/2002 | Kalina et al. |
| 6,520,392 B2 | 2/2003 | Thibodeau et al. |
| 6,969,122 B2 | 11/2005 | Sachs et al. |
| D575,669 S * | 8/2008 | David et al. ............... D11/200 |
| D603,752 S * | 11/2009 | David ............... D11/216 |
| D607,774 S * | 1/2010 | David ............... D11/216 |
| D611,385 S * | 3/2010 | Yair ............... D11/216 |
| D611,386 S * | 3/2010 | David ............... D11/216 |
| D616,330 S * | 5/2010 | David ............... D11/200 |
| 2006/0267394 A1 | 11/2006 | David et al. |
| 2010/0141010 A1 * | 6/2010 | Hamsund ............... 297/468 |

FOREIGN PATENT DOCUMENTS

| | | |
|---|---|---|
| DE | 4019402 A1 | 12/1991 |
| GB | 2439038 | 12/2008 |
| GM | 202005021354.3 | 5/2008 |
| WO | WO/2006/129297 | 12/2006 |
| WO | WO/2008/059472 | 5/2008 |

* cited by examiner

*Primary Examiner* — Paul N Dickson
*Assistant Examiner* — Laura Freedman

(57) ABSTRACT

A seatbelt adaptor, a system, and a method for enabling a user to improve the buckling and unbuckling of a child in a child booster safety seat in a vehicle, for use in conjunction with a conventional seatbelt restraint system, the seatbelt adaptor comprising a central lengthening device, an adaptor latch plate, and an adaptor buckle and wherein the length of the seatbelt adaptor is suited to improve upon the latching of the buckle of the seatbelt that secures a child seated in the child booster safety seat within a vehicle.

7 Claims, 11 Drawing Sheets

BOOSTER SEAT EQUIPPED WITH A SEATBELT ADAPTOR

REFERENCE TO CROSS-RELATED APPLICATION

This application is a Continuation-in-Part of U.S. patent application Ser. No. 11/560,864 filed Nov. 17, 2006, now U.S. Pat. No. 7,533,901 which is a Continuation-in-Part of PCT/IL2005/001174 filed Oct. 11, 2005, which claims priority benefits from U.S. patent application Ser. No. 11/162,827 filed Sep. 24, 2005, which claims priority benefits from U.S. Provisional Application No. 60/685,398, filed on May 31, 2005, herein incorporated by reference in its entirety.

FIELD AND BACKGROUND OF THE INVENTION

The present invention relates to a device, a system, an article of manufacture, and a method for setting up a child safety seat in a vehicle and, in particular to a device, an article of manufacture, and a method, enabling a quick and efficient way to fasten and release the belt buckles which fix the child safety seat or child sitting in the child booster safety seat to the seat's location on the vehicle seat.

Buckling a child to a vehicle seat with the vehicle's seatbelts does not provide sufficient protection in case of an emergency braking or in an accident, for reasons such as the following:

The seatbelts are not sufficiently snug on a small body and do not comprise a sufficient downwards force.

The shoulder belt could lacerate the child's neck.

Most children are not mature enough to be seated in a seat designated for adults.

Children cannot bend their knees at the end of the seat when their backs are against the backrest of the seat.

In order to overcome these difficulties, the child booster safety seat, which is a seat that raises the child and provides a higher sitting height so the adult lap and shoulder belts fit better, has been available for approximately thirty five years.

The standard recommendation is to use child booster safety seats for children of ages 4 to 8, weighing 20 to 40 kg.

An example of the existing standard setting is shown in FIGS. 1a and 1b.

FIG. 1a depicts a child safety seat, of child booster safety seat 13, on a vehicle's back seat 11 near the backrest of the back seat 12. On one side of the child booster safety seat 13 the vehicle's seatbelt 14 is disposed with a latch plate 15 attached to it and on the other side, a buckle 16. Usually, the buckle 16 is disposed in the vehicle's back seat 11 suitably for the comfort of adult passengers.

FIG. 1b depicts the instance in which a child 17 is properly seated with the vehicle's seatbelt 14 latched by connecting the latch plate 15 into the buckle 16. This configuration makes the access of the buckles by two adult hands in order to latch them extremely difficult. The latching action becomes even harder when an additional safety seat or a baggage item such as a bag or suitcase is placed beside the buckle 16.

Vehicle's seatbelt 14 is a continuous strap including an upper segment 14d which crosses the child's chest diagonally, from one shoulder to the waist on the opposite side, through latch plate 15 and over the child's lap as a lap second segment 14b The left side of the illustration shows a magnified illustration of latch plate 15 which is connected to buckle 16 and a small segment of upper segment 14d. Latch plate 15 has a slot 15a through which vehicle's seatbelt 14 passes, and is actually the place at which the vehicle's seatbelt 14 is divided into both segments.

As used herein the specification and in the claims section that follows, the term "the seat belt total equivalent force exertion point" and the like refer to the point at which the total equivalent force is substantially exerted by the vehicle's seatbelt 14 on latch plate 15.

The illustration shows the seat belt's total equivalent force exertion point marked as point 40, which is disposed approximately in the center of the upper part of slot 15a.

When a child is fastened in a safety seat, the possibility to quickly and easily unfasten the seatbelt's buckles is of utmost importance, especially when the child needs to be removed from the vehicle as quickly as possible. The duration of the belt buckles' release action in the existing situation may be critical in an emergency because of the limited access to the belt buckles.

FIG. 1c depicts an option of the prior art in which rigid parts, such as latch plate 15 and buckle 16, of a child restraint system are in contact with a child booster safety seat 13. This contact, when a tension force is exerted on the restraint system, could exert forces in unwanted directions on the child booster safety seat 13. In addition, this contact, especially when the structure of the child booster safety seat 13 in the area of contact is a rigid structure, could cause the child seated in the child booster safety seat 13 discomfort as a result of friction and being hit by the rigid parts of the restraint system.

There is therefore a need to improve the setup of a child booster safety seat in a vehicle and to ensure the possibility of speedy release of the seatbelts strapping the child into the child booster safety seat.

SUMMARY OF THE INVENTION

It is an objective of the present invention to provide a device, an article of manufacture, and a method to improve the setup of a child safety seat in a vehicle.

According to the present invention there is provided a method enabling a user to improve buckling and unbuckling of a child in a child booster safety seat in a vehicle, for use in conjunction with a conventional seatbelt restraint system, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the method including the steps of: (a) providing the user with a seatbelt adaptor, the seatbelt adaptor including: (i) a central lengthening device; (ii) an adaptor latch plate for attachment and detachment to the buckle of the conventional seatbelt restraint system, the adaptor latch plate disposed at a first end of the central lengthening device; and (iii) an adaptor buckle for attachment and detachment to the latch plate of the conventional seatbelt restraint system, the adaptor buckle disposed at a second end of the central lengthening device: (b) connecting the adaptor latch plate to the buckle of the vehicle's conventional seatbelt restraint system located near the vehicle's seat; and then; (c) seating the child in the child booster safety seat; and then (d) connecting the latch plate of the vehicle's conventional seatbelt restraint system to the adaptor buckle, wherein the vehicle's seatbelt is to be fastened on the child's body.

According to further features in the described embodiments the adaptor latch plate is configured for connecting to the buckle of the conventional seatbelt restraint system, and wherein the adaptor buckle is configured for connecting to the latch plate of the conventional seatbelt restraint system, that secures a child into the child booster safety seat within the motor vehicle, and wherein the length of the seatbelt adaptor is so dimensioned as to be suited to improve the latching of the buckle of the motor vehicle's conventional seatbelt restraint system.

According to further features in the described embodiments the geometrical characteristics of the child booster safety seat, the seatbelt adaptor, the latch plate of the conventional seatbelt restraint system, and the buckle of the conventional seatbelt restraint system are such that the maximum vertical displacement of the slot of the latch plate of the conventional seatbelt restraint system from an anchoring point of the buckle of the conventional restraint system to a vehicle frame of the vehicle when the latch plate of the conventional seatbelt restraint system is connected to the adaptor buckle, and the adaptor latch plate is connected to the buckle of the conventional seatbelt restraint system, is approximately six to eight centimeters above an upper surface of the child booster safety seat, the characteristics thereby enabling fast and easy release of the child from the child restraint system, and further enabling that in case of emergency braking, the lap segment of the seatbelt will exert an adducting force having a downward component and a backward component, relative to the vehicle, so as to adduct the child's lap downwards and backwards with regard to the child booster safety seat, and the chest and shoulder segment of the seatbelt will exert a backwards adducting force on a the child's chest.

According to further features in the described embodiments the geometrical characteristics of the child booster safety seat, the seatbelt adaptor, the latch plate of the conventional seatbelt restraint system, and the buckle of the conventional seatbelt restraint system are such that the maximum vertical displacement of the slot of the latch plate of the conventional seatbelt restraint system from an anchoring point of the buckle of the conventional restraint system to a vehicle frame of the vehicle when the latch plate of the conventional seatbelt restraint system is connected to the adaptor buckle, and the adaptor latch plate is connected to the buckle of the conventional seatbelt restraint system, is approximately eight to ten centimeters above an upper surface of the child booster safety seat, the characteristics thereby enabling fast and easy release of the child from the child restraint system, and further enabling that in case of emergency braking, the lap segment of the seatbelt will exert an adducting force having a downward component and a backward component, relative to the vehicle, so as to adduct the child's lap downwards and backwards with regard to the child booster safety seat, and the chest and shoulder segment of the seatbelt will exert a backwards adducting force on a the child's chest.

According to further features in the described embodiments the geometrical characteristics of the child booster safety seat, the seatbelt adaptor, the latch plate of the conventional seatbelt restraint system, and the buckle of the conventional seatbelt restraint system are such that the maximum vertical displacement of the slot of the latch plate of the conventional seatbelt restraint system from an anchoring point of the buckle of the conventional restraint system to a vehicle frame of the vehicle when the latch plate of the conventional seatbelt restraint system is connected to the adaptor buckle, and the adaptor latch plate is connected to the buckle of the conventional seatbelt restraint system, is approximately ten to twelve centimeters above an upper surface of the child booster safety seat, the characteristics thereby enabling fast and easy release of the child from the child restraint system, and further enabling that in case of emergency braking, the lap segment of the seatbelt will exert an adducting force having a downward component and a backward component, relative to the vehicle, so as to adduct the child's lap downwards and backwards with regard to the child booster safety seat, and the chest and shoulder segment of the seatbelt will exert a backwards adducting force on a the child's chest.

According to further features in the described embodiments the adaptor buckle includes no permanent bolt coupling.

According to further features in the described embodiments the latch plate of the conventional seatbelt restraint system to the adaptor buckle is done when there is baggage on the vehicle's seat, making the connecting difficult.

According to further features in the described embodiments the central lengthening device is an elastic device.

According to further features in the described embodiments the central lengthening device is a safety belt.

According to further features in the described embodiments the central lengthening device is a safety belt with adjustable length.

According to further features in the described embodiments the central lengthening device is a rigid device.

According to further features in the described embodiments the method further includes the step of: (e) testing to determine whether in a case of emergency braking the lap segment of the safety seatbelt will exert an aducing force having a downward component and a backward component relative to the vehicle, so as to adduct the child's lap downwards and backwards with regard to the child booster safety seat.

According to further features in the described embodiments the method further includes the step of: (e) testing to determine whether in a case of emergency break the slot of the latch plate of the conventional seatbelt restraint system which the safety seatbelt passes through, is located below the level of the child's waist.

According to still further features in the described embodiments the testing includes pulling the chest and shoulder segment in a direction in front of the child's chest diagonally, toward the shoulder of the child.

According to further features in the described embodiments the method further includes the step of: (e) before the connection of the adaptor latch plate to the buckle of the vehicle's conventional seatbelt restraint system located near the vehicle's seat, attaching the seatbelt adaptor to the child booster safety seat.

According to further features in the described embodiments the method further includes the step of: (e) disconnecting the vehicle's seatbelt latch plate from the buckle of the seatbelt adaptor.

According to further features in the described embodiments the seatbelt adaptor is selected from a set of a plurality of seatbelt adaptors, each of the seatbelt adaptors having a central lengthening device, with a different length.

According to the teaching of the present invention there is provided a seatbelt adaptor, for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the seatbelt adaptor including: (a) a rigid central lengthening device; (b) an adaptor latch plate for attachment and detachment to the buckle of the conventional seatbelt restraint system, the adaptor latch plate disposed at a first end of the central lengthening device; and (c) an adaptor buckle for attachment and detachment to the latch plate of the conventional seatbelt restraint system, the adaptor buckle disposed at a second end of the central lengthening device, wherein the adaptor latch plate is configured for connecting to the buckle of the conventional seatbelt restraint system, and wherein the adaptor buckle is configured for connecting to the latch plate of the conventional seatbelt restraint system, that secures a child into the child booster safety seat within the motor vehicle.

According to further features in described embodiments the adaptor buckle includes a mechanism base, having a mechanism base bottom surface, wherein the rigid central lengthening device has a rigid central lengthening device bottom surface, wherein the adaptor latch plate has an adaptor latch bottom surface, wherein the mechanism base, the rigid central lengthening device, and the adaptor latch plate, are made from one piece material, and wherein the mechanism base bottom surface, the rigid central lengthening device bottom surface, and the adaptor latch bottom surface, are lying operatively on one plane.

According to further features in described embodiments the seatbelt adaptor further includes: (d) an adaptor buckle indentation at a place at one end of the rigid central lengthening device close to an intersection of the rigid central lengthening device and the adaptor buckle; and (e) a release button mounted at second end of the rigid central lengthening device.

According to further features in described embodiments the seatbelt adaptor further includes: (f) a coupling means disposed on the seatbelt adaptor.

According to the teaching of the present invention there is provided a system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system including: (a) a child booster safety seat, having an upper surface for the child to sit upon; and (b) a seatbelt adaptor, the seatbelt adaptor including: (i) a rigid central lengthening device; (ii) an adaptor latch plate for attachment and detachment to the buckle of the conventional seatbelt restraint system, the adaptor latch plate disposed at a first end of the central lengthening device; and (iii) an adaptor buckle for attachment and detachment to the latch plate of the conventional seatbelt restraint system, the adaptor buckle disposed at a second end of the central lengthening device, wherein the adaptor latch plate is configured for connecting to the buckle of the conventional seatbelt restraint system, wherein the adaptor buckle is configured for connecting to the latch plate of the conventional seatbelt restraint system, that secures a child into the child booster safety seat within the motor vehicle, wherein the length of the seatbelt adaptor is so dimensioned as to be suited to improve the latching of the buckle of the motor vehicle's conventional seatbelt restraint system, and wherein the adaptor buckle includes a mechanism base, having a mechanism base bottom surface, wherein the rigid central lengthening device has a rigid central lengthening device bottom surface, wherein the adaptor latch plate has an adaptor latch bottom surface, wherein the mechanism base, the rigid central lengthening device, and the adaptor latch plate, are made from one piece material, and wherein the mechanism base bottom surface, the rigid central lengthening device bottom surface, and the adaptor latch bottom surface, are lying operatively at one plane.

According to further features in described embodiments the seatbelt adaptor further includes: (iv) a adaptor buckle indentation at a place at one end of the rigid central lengthening device close to an intersection of the rigid central lengthening device and the adaptor buckle; and (v) a release button mounted at second end of the rigid central lengthening device.

According to further features in described embodiments the seatbelt adaptor further includes: (vi) a coupling means disposed on said seatbelt adaptor; and (vii) a coupling means disposed on the child booster safety seat, wherein the seatbelt adaptor has a weight value, and wherein the seatbelt adaptor can be detached from the booster safety seat by a pulling force of value four times the value of the seatbelt adaptor weight value.

According to further features in described embodiments the child booster safety seat includes: (i) a lower anchors and tethers for children (LATCH) device.

BRIEF DESCRIPTION OF THE DRAWINGS

The invention is herein described, by way of example only, with reference to the accompanying drawings, wherein:

FIG. 3b is a schematic illustration of a preferred embodiment of the present invention depicting a front view of the necessary direction of the vertical force exerted by the seat belt during an emergency braking on a child seated in the child booster safety seat as depicted in FIG. 3a.

FIG. 4b is a schematic illustration of section a-a of FIG. 4a.

FIG. 4c is a schematic illustration of section b-b of FIG. 4a.

DESCRIPTION OF THE PREFERRED EMBODIMENTS

Figure 1A:
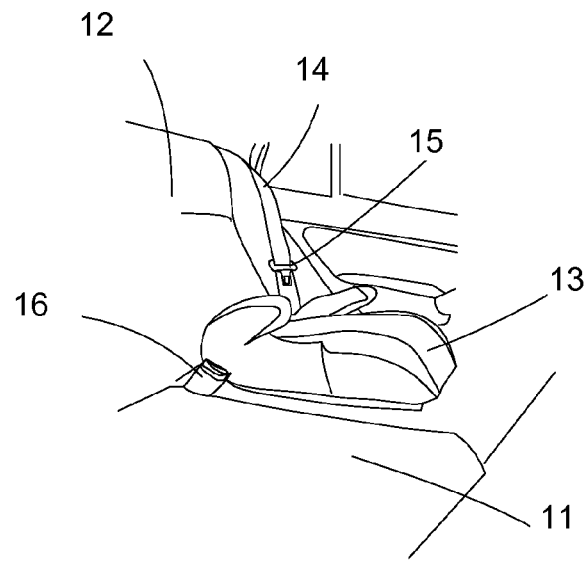
FIG. 1a of the prior art illustrates an empty safety seat placed in the back seat of a medium sized passenger vehicle.

The present invention is a seatbelt adaptor, a system, an article of manufacture and a method to improve the setup of a child safety seat in a vehicle.

The principles and operation of the seatbelt adaptor, the system, the method, and the article of manufacture according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, methods, and examples provided herein are illustrative only and not intended to be limiting.

Figure 2A:
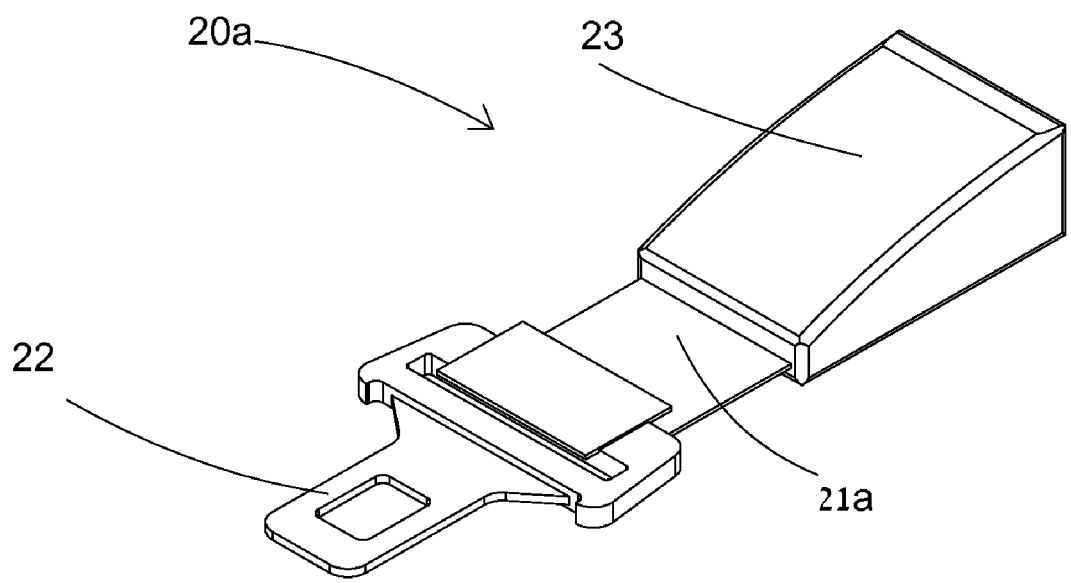
FIG. 2a is a schematic illustration of a preferred embodiment of a seatbelt adaptor with a strap of a fixed length.

The following list is a legend of the numbering of the application illustrations:

11 vehicle's back seat
12 backrest of the vehicle's back seat
13 child booster safety seat
13a deep level
13b less deep level
13c booster seat backrest
13e booster seat wall
13f lower anchors and tethers for children (LATCH) device
14 vehicle's seatbelt (of the vehicle conventional seatbelt restraint system)
14a lap first segment (of the vehicle conventional seatbelt restraint system)
14b lap second segment, (of the vehicle conventional seatbelt restraint system)
14c lap third segment (of the vehicle conventional seatbelt restraint system)
14d upper segment (of a seatbelt of the vehicle conventional seatbelt restraint system)
15 latch plate (of the vehicle conventional seatbelt restraint system)
15a slot (of a latch plate of the vehicle conventional seatbelt restraint system)
16 buckle (of the vehicle conventional seatbelt restraint system)
17 child
18 vehicle's anchoring seatbelt
19 connector
20 seatbelt adaptor
20a seatbelt adaptor with a safety belt of a fixed length
20b seatbelt adaptor with a belt of adjustable length
20c rigid seatbelt adaptor
20d elastic seatbelt adaptor
21a safety belt of a fixed length
21b belt of adjustable length
21c rigid central lengthening device
21bs rigid central lengthening device bottom surface
21d elastic central lengthening device
22 adaptor latch plate
22bs adaptor latch bottom surface
23 adaptor buckle
23a adaptor buckle envelope
24 ring
25 device which prevents the buckle's release by a child
26 adaptor buckle indentation
27 release button
28 orifice
29 rigid part
29a mechanism base
29bs mechanism base bottom surface
30L child left leg
30R child right leg 40 a total equivalent force exertion point
41 upper surface of the vehicle's back seat
42 upper surface of the booster safety seat
43 virtual surface (on level with the child's legs)
44 surface of the vehicle's back seat backrest
45 surface of the booster seat backrest
46 point of contact between the upper part of the child's thighs and the front part of his waist
50 vehicle's frame
51 screw
52 anchoring point
54 magnetic coupling means
55a Velcro coupling means first layer
55b Velcro coupling means second layer
60 common bottom plane Referring now to the drawings, FIG. 2a is a schematic illustration of a preferred embodiment of a seatbelt adaptor with a safety belt of a fixed length 20a with a safety belt of a fixed length 21a. The safety belt of a fixed length 21a lacks any practical resistance to flexion loads and can be identical or similar to the existing seatbelts already installed in the vehicle in which it will be installed as a matter of the material of which it is made and its dimensions, except for its length, which is fitted for its unique purpose. An adaptor latch plate 22 is disposed at one end of the safety belt of a fixed length 21a and an adaptor buckle 23 is disposed at the other end of the safety belt of a fixed length 21a. Adaptor latch plate 22 and adaptor buckle 23 are connectors which are compatible with the vehicle's seatbelt buckles and latches. Safety belt of a fixed length 21a constitutes a central lengthening device, which mechanically connects adaptor latch plate 22 and adaptor buckle 23, and determines the distance between them.

The adaptor latch plate 22 and the adaptor buckle 23 clearly must be adapted to the latch plate 15 and the buckle 16 installed in the vehicle. The internal mechanism and external form and dimensions of adaptor buckle 23 can be identical or similar to those of buckle 16.

The operation of adaptor buckle 23 clearly should preferably be identical or similar to the operation of buckle 16, and in any case, its operation must not be more complicated or time consuming, nor less convenient, and should not pose any new limitations.

This applies to all possible embodiments of seatbelt adaptor 20 according to the present invention.

This invention is not limited to the use of a specific safety belt and the adaptor latch plate 22 and the adaptor buckle 23 may be connected by many means, such as one or more chains, one or more strings, or as depicted later in FIGS. 2b-2d.

This invention is not limited to the type of buckles which enable the connection of the seatbelt adaptor, to the vehicle's seatbelt and vehicle's seatbelt buckles.

The invention also includes the possibility of connecting the seatbelt adaptor directly to the anchoring point of the vehicle's safety belts.

Figure 2B:
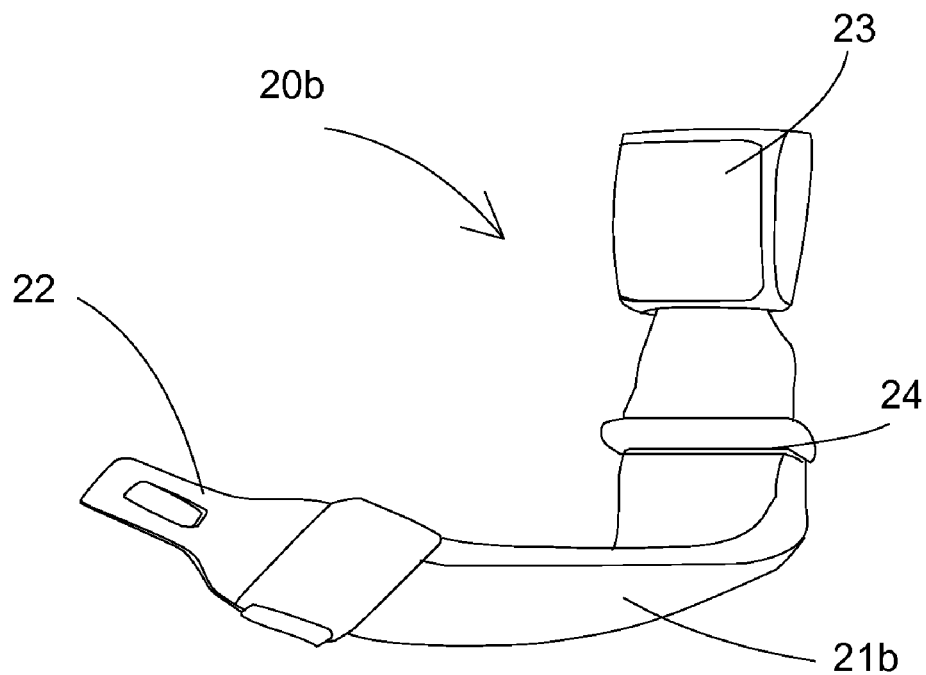
FIG. 2b is a schematic illustration of a preferred embodiment of a seatbelt adaptor with a strap of adjustable length.

FIG. 2b is a schematic illustration of a preferred embodiment of a seatbelt adaptor with a belt of adjustable length 20b with a belt of adjustable length 21b. The difference in comparison with seatbelt adaptor of a fixed length 20a is that in seatbelt adaptor with a belt of adjustable length 20b has a belt of adjustable length 21b. There are many ways to construct a belt of adjustable length, which anyone skilled in the art is familiar with. The current figure schematically illustrates a ring 24 to which the end of the adjustable length belt 21b is connected through adaptor latch plate 22.

Figure 2C:
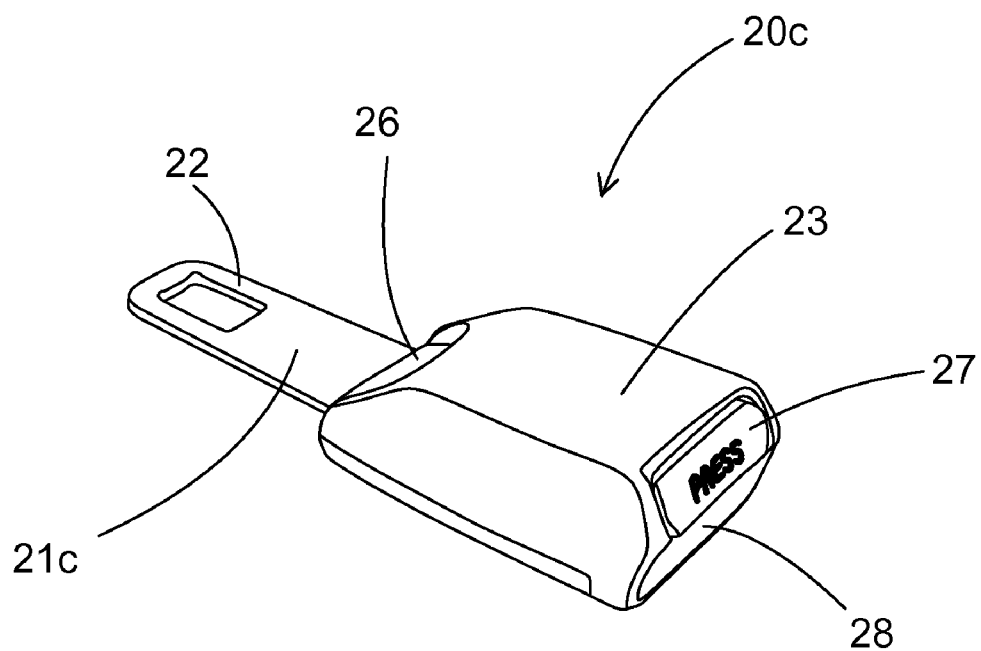
FIG. 2c is a schematic perspective illustration of a preferred embodiment of a seatbelt adaptor made as a rigid unit.

FIG. 2c is a schematic perspective illustration of a preferred embodiment of a rigid seatbelt adaptor 20c, whose structure, and in particular whose rigid central lengthening device 21c is practically non-bendable by reasonable bending moments which may be induced on it. Adaptor buckle 23 can include an adaptor buckle indentation 26 for the purpose of facilitating release, with the press of a finger, of a buckle of the motor vehicle conventional seatbelt restraint system.

In the rear part of adaptor buckle 23 is an orifice 28, through which a latch plate of the motor vehicle conventional seatbelt restraint system can be inserted and removed, as well as a release button 27 which enables releasing a latch plate of the motor vehicle conventional seatbelt restraint system, by a single press of a finger.

Note: the release button 27 is a component which is included in all embodiments of the adaptor buckle according to the present invention.

Figure 2D:
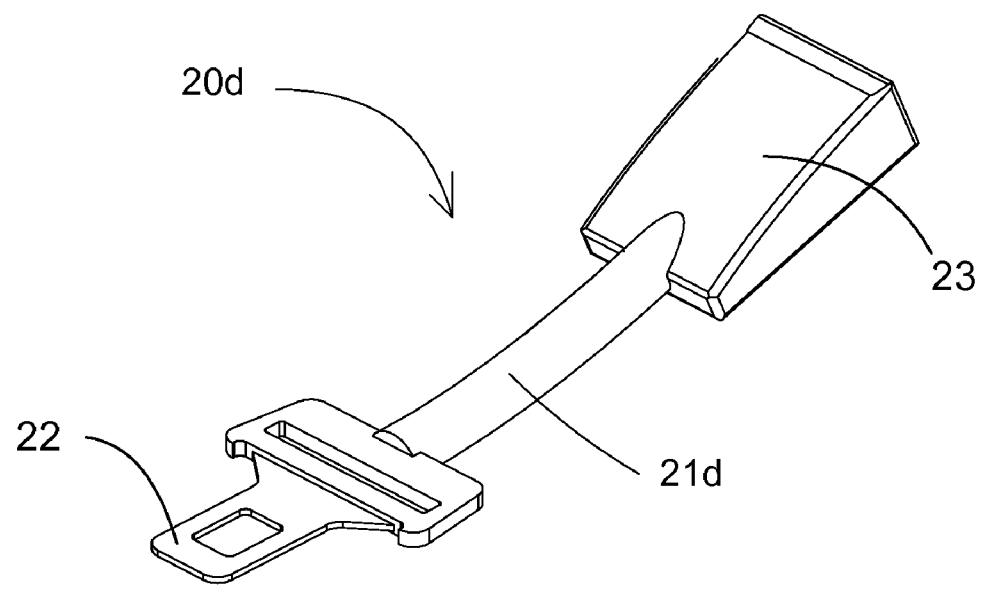
FIG. 2d is a schematic illustration of a preferred embodiment of a seatbelt adaptor made as an elastic unit.

FIG. 2d is a schematic illustration of a preferred embodiment of a elastic seatbelt adaptor 20d. Its structure and properties are similar to those of rigid seatbelt adaptor 20c except for its elastic central lengthening device 21d, which has elastic properties regarding the reasonable bending moments that may be induced on it.

Figure 2E:
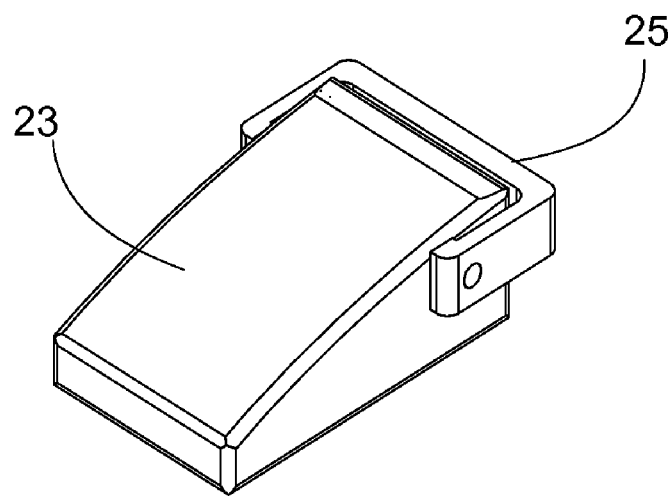
FIG. 2e is a schematic illustration of a preferred embodiment of a seatbelt adaptor with an apparatus preventing the buckle release by a child.

FIG. 2e is a schematic illustration of adaptor buckle 23 equipped with a device which prevents the buckle's release by a child 25.

Figure 2F:
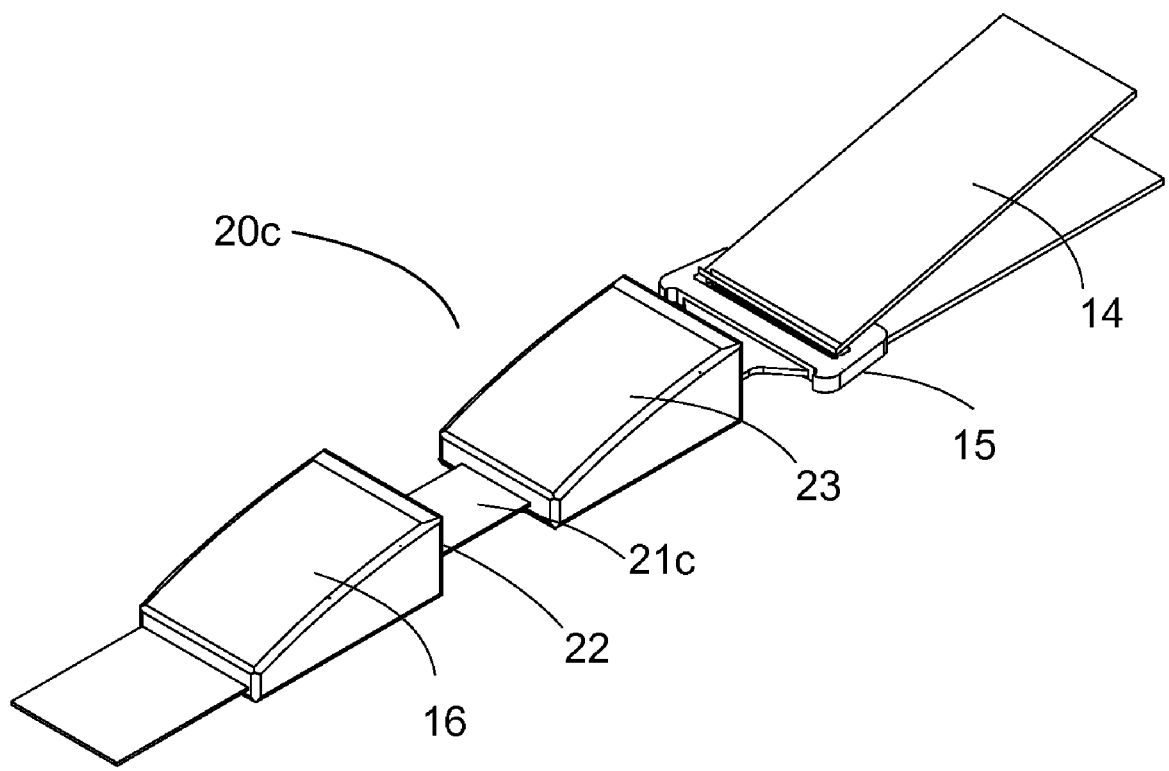
FIG. 2f is a schematic illustration of a preferred embodiment of a seatbelt adaptor attached to the vehicle's seatbelts.

FIG. 2f is a schematic illustration of rigid seatbelt adaptor 20c connected to the vehicle's seatbelts. Adaptor latch plate 22 is connected to the buckle 16 of the vehicle conventional seatbelt restraint system and adaptor buckle 23 is connected to the latch plate 15 of the vehicle conventional seatbelt restraint system, through which the vehicle's seatbelt 14 passes. The vehicle's seatbelt 14 is originally designed to be used on an adult's waist and diagonally from one hip towards the opposite shoulder.

Child booster safety seats are in use because vehicle's seatbelts are not designed for children. Young children are too small for vehicle's seatbelts and too large for infant safety seats.

Millions of parents and caregivers use child booster safety seats as protection for their children who have outgrown their infant safety seats but aren't tall enough for vehicle's seatbelts.

The location in which latch plate 15 of the vehicle conventional seatbelt restraint system, through which the vehicle's seatbelt 14 passes, is connected to the vehicle's original buckle 16 of the vehicle conventional seatbelt restraint system, and the location according to the present invention of the connection between the latch plate 15, through which the vehicle's seatbelt 14 passes, and the buckle of the rigid seatbelt adaptor with regard to the child booster safety seat and the child seated upon it, are of utmost importance.

Even though the present illustration describes a rigid seatbelt adaptor 20c, any other embodiment of the seatbelt adaptor according to the present invention can also be used.

The requirements that the components of a safety system comprised of a child booster safety seat, a vehicle's seatbelt, a latch plate, and a buckle, must meet include the following:

Any contact between a component of the system and the child that could harm the child as a result of friction, injury, or any other cause, when in use under normal travel conditions, when buckling and releasing, and in the case of emergency braking or an accident, is prohibited.

When a vehicle slows down abruptly, for example during emergency braking or a collision, the vehicle's seatbelt segment that is in the child's lap must fasten the child to the seat, with combined force exerted downwards and backwards with regard to the vehicle's axes, namely force must be exerted towards the vehicle's seat and towards the backrest of the seat, upon which the seat is placed.

The vehicle's seatbelt must be able to be quickly and easily released in case of an emergency.

The location of the original buckle in a vehicle's seats is based on consideration of the forces exerted downwards and backwards on an adult seated in the seat, in case of need, and therefore the buckle is positioned low and close to the seat and its backrest. As a result, in many cases the requirement of fast release of the buckle, when used in conjunction with a child booster safety seat, is impaired, particularly when an additional child booster safety seat or other baggage item is also placed on the vehicle seat.

This problem has been known of for years, however no satisfactory solution has been found for it so far. Some parents have just given up on the possibility of connecting the vehicle's seatbelt and reasonably every time they seat their children in a safety seat, and have turned to the highly hazardous practice of fastening the buckles only once and seating and removing their children without unfastening the buckles.

The use of an existent lengthening strap for facilitating fastening and unfastening of the buckles is also hazardous. Many vehicle manufacturers have lengthening straps designed for larger passengers to buckle up in their vehicles. An example of this is Ford's seatbelt extender, which is a piece of seat belt material about 8 inches long with buckles on the ends of it that click into the existing seat belt buckles. Use of a seatbelt lengthening such as this is hazardous as it does not meet the requirement of adducting forces in the right directions.

According to the present invention, the child booster safety seat is used in conjunction with a seatbelt adaptor, whose qualities, and particularly whose length, are adapted to meet the safety requirements and also ensure that the location of the connection point of the latch plate 15 through which the vehicle's seatbelt 14 passes will be optimally practical. The optimal location is determined by the length of the seatbelt adaptor, which serves as a compromise between the minimal length which has an advantage with regard to the aforementioned force directions, and the maximal length which has an advantage with regard to the aforementioned convenience of unfastening. The boundaries of this field are from the shortest possible length defined by the size limitations of the components to the longest possible length that in case of emergency braking with exertion of force on the diagonal segment of the vehicle's seatbelt, the tension that is generated due to the high location of latch plate 15 does not generate a downwards adducting force in the vehicle's seatbelt segment resting in the child's lap.

The seatbelt adaptor can be connected to the buckle 16 and can be removed when an adult is seated and buckled up in the seat, or can be connected directly to an anchoring point in the vehicle.

In the case that the seatbelt adaptor is connected to an anchoring point within the vehicle, it can be of a fixed length that is a compromise between buckling up an adult and buckling up a child in a safety seat.

Figure 3A:
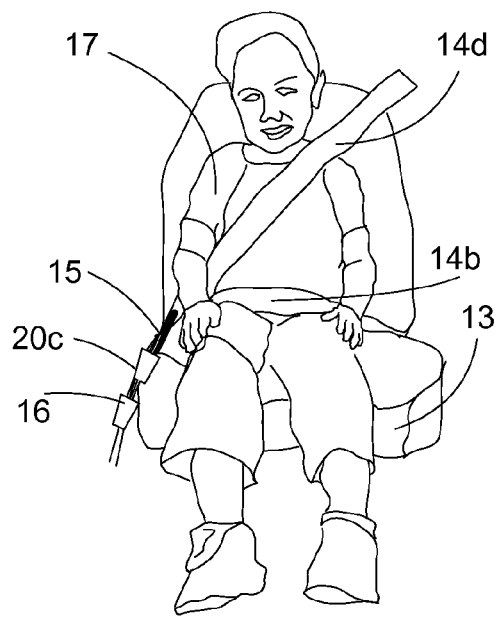
FIG. 3a depicts a front view of a child seated in a child booster safety seat, with the seatbelts fastened according to a preferred embodiment of the present invention.

FIG. 3a illustrates the front view of a child 17 seated in a child booster safety seat 13, with the vehicle's seatbelt fastened according to a preferred embodiment of the present invention. The child 17 is seated in the child booster safety seat 13 and is buckled in a vehicle's seatbelt whose upper segment 14d crosses the child's chest diagonally, from one shoulder to the waist on the opposite side, through latch plate 15 of the vehicle conventional seatbelt restraint system, and over the child's lap as a lap second segment 14b of the vehicle conventional seatbelt restraint system, of the vehicle's seatbelt. The latch plate 15 connects to rigid seatbelt adaptor 20c which is connected to the buckle 16 of the vehicle conventional seatbelt restraint system.

Note: even though this illustration shows a rigid seatbelt adaptor 20c, this is not intended in any way to limit the use of any other type of seatbelt adaptors according to the present invention. This also applies to the illustrations shown in FIGS. 3b-3h.

Figure 3B:
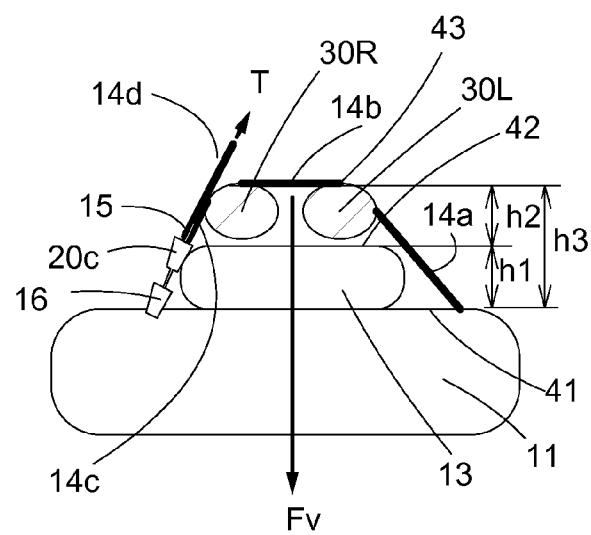

FIG. 3b is a schematic illustration of a preferred embodiment of the present invention depicting a front view of the required direction of the vertical force Fv exerted by the seatbelt on the child seated in the child booster safety seat 13, as described in FIG. 3a. The child booster safety seat 13, which is placed upon the vehicle's back seat 11, seats a child whose right leg 30R and left leg 30L are shown in the illustration in section. This illustration shows the vehicle's seatbelt in further detail, with its diagonal segment, the upper segment 14d reaching latch plate 15, inside which it bends back over approximately 180 degrees and returns with the vehicle seatbelt lap third segment 14c until bending over the child's right leg 30R, continuing as an approximately horizontal lap second segment 14b until bending back diagonally downwards over the child's left leg 30L as vehicle's seatbelt lap first segment 14a. Latch plate 15 of the vehicle conventional seatbelt restraint system, connects to rigid seatbelt adaptor 20c, which is connected to buckle 16 of the vehicle conventional seatbelt restraint system. In case of emergency braking, tension T is generated in the vehicle's seatbelt, exerting adducting force Fv downwards relative to the vehicle and adducting the child's lap area downwards to the safety seat. The illustration shows three surfaces, the upper surface of the vehicle's back seat 41, upon which the child booster safety seat 13 is placed, the upper surface of the booster safety seat 42, upon which the child is seated, which can also be the upholstery of said child booster safety seat 13 or a cushion, and virtual surface 43 at level with the child's legs 30L and 30R, defining the boundaries for seatbelt lap segment 14b.

The illustration also shows the gaps between these surfaces, with h1 being the vertical gap between the upper surface of the vehicle's back seat 41 and the upper surface of the booster safety seat 42, h2 being the vertical gap between the upper surface of the booster safety seat 42 and the virtual surface 43; and h3 being the vertical gap between the upper surface of the vehicle's back seat 41 and the virtual surface 43.

Figure 3C:
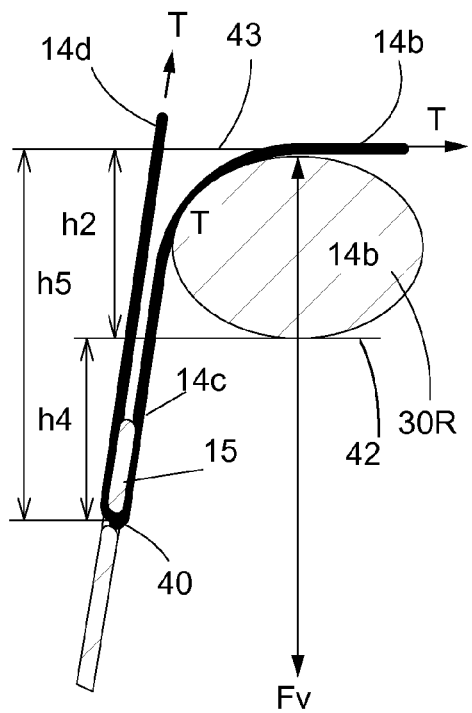
FIG. 3c is a schematic illustration of a preferred embodiment of the present invention depicting a detailed magnification of a part of FIG. 3b.

FIG. 3c is a schematic illustration of a preferred embodiment of the present invention enlarging a part of FIG. 3b.

A total equivalent force exertion point 40 is the point at which the total equivalent force is exerted by the vehicle's seatbelt 14 of the vehicle conventional seatbelt restraint system, on latch plate 15 of the vehicle conventional seatbelt restraint system.

This illustration shows a section of latch plate 15 with both vehicle lap third segment 14c and upper segment 14d changing direction at approximately 180 degrees at an axis including total equivalent force exertion point 40. For the tension force T in the vehicle's seatbelt to generate a downwards adducting force Fv in case of need, total equivalent force exertion point 40 must be sufficiently low with regard to the safety seat and the child's leg 30R, otherwise the tension force T will create a distance between the seatbelt lap second segment 14b and the child's legs and enable the child to be separated from the seat, causing severe harm to the child in case of emergency braking and an accident. The illustration also shows the vertical gap h4 between the total equivalent force exertion point 40 and the upper surface of the booster safety seat 42 and vertical gap h5 between the total equivalent force exertion point 40 and the virtual surface 43.

Figure 3D:
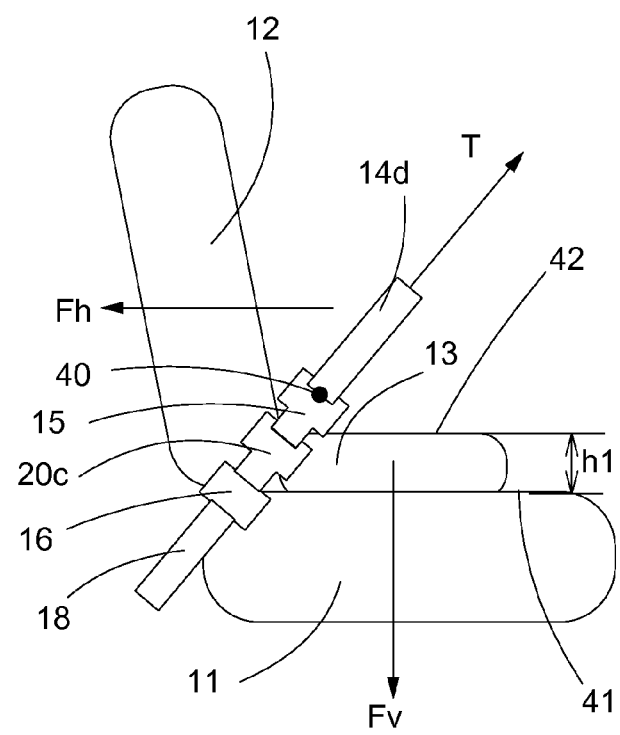
FIG. 3d is a schematic illustration of a preferred embodiment of the present invention depicting a side view of the necessary directions of horizontal and vertical forces exerted by the seatbelt during emergency braking on the child seated in a child booster safety seat.

FIG. 3d is a schematic illustration of a preferred embodiment of the present invention showing a side view of the required directions of the vertical and horizontal forces that are exerted by the seatbelt on the child seated in the child booster safety seat 13 during an emergency braking. Proper location of the total equivalent force exertion point 40, which was explained in the description of FIG. 3c, will ensure the generation of a force with adducting components, downwards component Fv on the vertical plane and backwards component Fh on the horizontal plane with regard to the vehicle's axes, when tension force T is exerted. Proper location of the total equivalent force exertion point 40 ensures that gap h5 is large enough when the total equivalent force exertion point 40 is on a lower plane than that of the virtual surface 43 or even on a lower plane than that of the upper surface of the booster safety seat 42 so that downwards adducting force component Fv is exerted in the case of need. Gap h4 also depends on the geometric qualities of the child booster safety seat 13, the seatbelt adaptor, the latch of the conventional seatbelt restraint system, and the buckle of the conventional seatbelt restraint system.

Figure 1B:
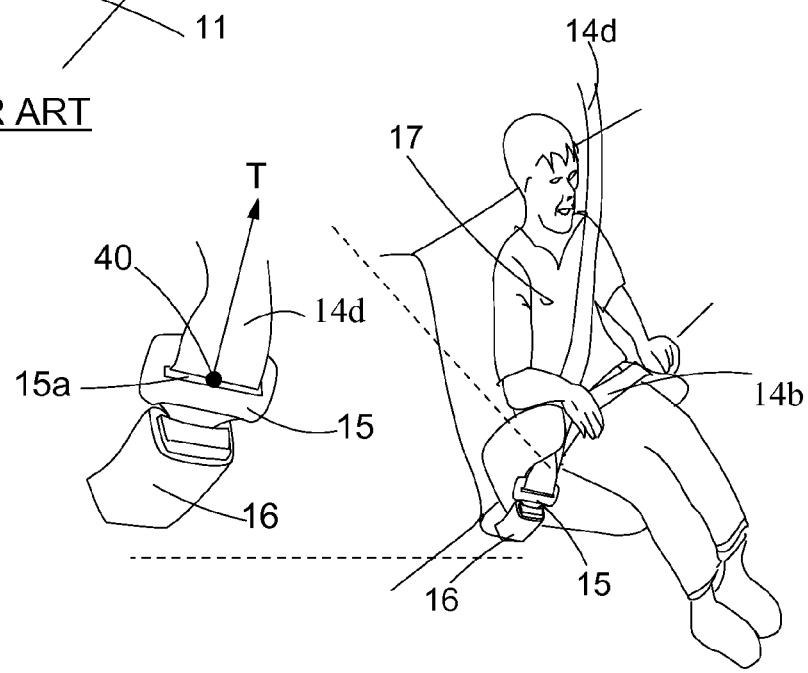
FIG. 1b of the prior art illustrates a child seated in a safety seat, with the seatbelts fastened. The safety seat is installed in the back seat of a medium sized passenger vehicle.
Figure 1C:
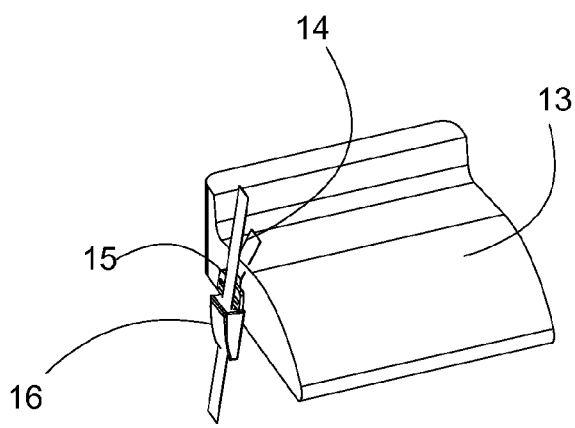
FIG. 1c is a schematic illustration of an option of the prior art, in which rigid parts, such as latch plate and buckle, of a child restraint system are in contact with a child booster safety seat.
Figure 3E:
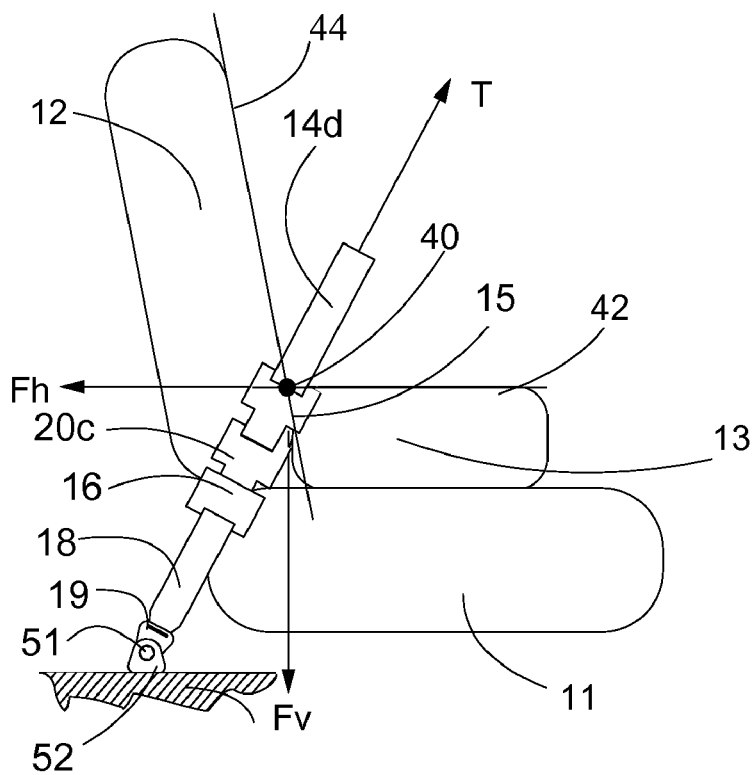
FIG. 3e is a schematic illustration of a preferred embodiment of the present invention depicting a side view showing the seat belt's total equivalent force exertion point, when it is on a section line of the seat surface of the child booster safety seat with the surface of the backrest of the vehicle seat upon which the child booster safety seat is placed.

FIG. 3e is a schematic illustration of a preferred embodiment of the present invention depicting a side view, with the geometrical dimensions of a rigid seatbelt adaptor 20c ensuring that when a rigid seatbelt adaptor 20c is connected between latch plate 15 of the vehicle conventional seatbelt restraint system, and buckle 16 of the vehicle conventional seatbelt restraint system, forming an integrative system including the vehicle's seatbelt 14, passing through slot 15a (see FIG. 1b) of the latch plate 15 with latch plate 15 connected to a rigid seatbelt adaptor 20c, which is connected to buckle 16 connected to the vehicle's anchoring seatbelt 18 (or any other suitable device installed in the vehicle), whose other end includes a connector which is connected, for example by means of a screw 51 to an anchoring point 52, which is connected directly to the vehicle's frame 50, and force T is exerted on the vehicle's seatbelt upper segment 14d in the suitable direction; the seat belt's total equivalent force exertion point 40 is on the section line of the upper surface of the booster safety seat 42 of the child booster safety seat 13 with the surface of the vehicle's back seat backrest 44 of the backrest of the vehicle's back seat 12 of the vehicle's back seat 11 on which the child booster safety seat 13 is placed.

This ensures that the forces exerted on a child seated in the booster seat, of any physical dimensions, no matter how small, by the seatbelt 14 will be in such directions that the child will be adducted downwards towards the child booster safety seat 13 and backwards towards the backrest of the vehicle's back seat 12.

Figure 3F:
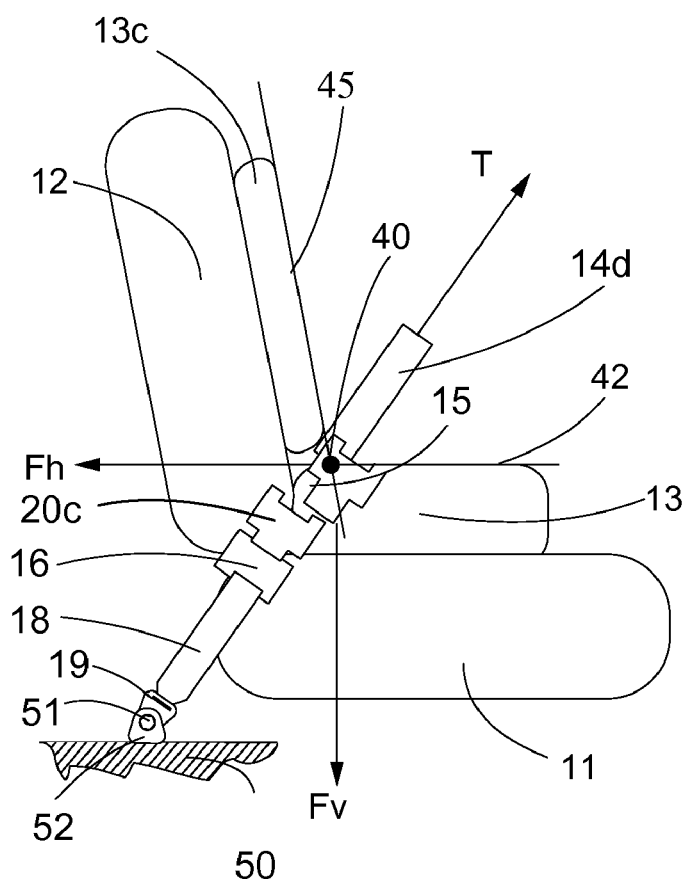
FIG. 3f is a schematic illustration of a preferred embodiment of the present invention depicting a side view showing the seat belt's total equivalent force exertion point, when it is on a section line of the seat surface of the child booster safety seat with the surface of the backrest of the child booster safety seat.

FIG. 3f is a schematic illustration of a preferred embodiment of the present invention depicting a side view. The illustration and accompanying description are identical to those of the previous illustration, other than the fact that the geometrical dimensions of rigid seatbelt adaptor 20c have been adapted for use with a child booster safety seat 13 which has a backrest 13c on whose surface 45 the seated child can rest his back.

The geometrical dimensions of rigid seatbelt adaptor 20c in this case ensure that the seat belt's total equivalent force exertion point 40 will be on the section line of the seat surface 42 of the child booster safety seat 13 with the surface 45 of the child booster safety seat 13 booster seat backrest 13c.

Figure 3G:
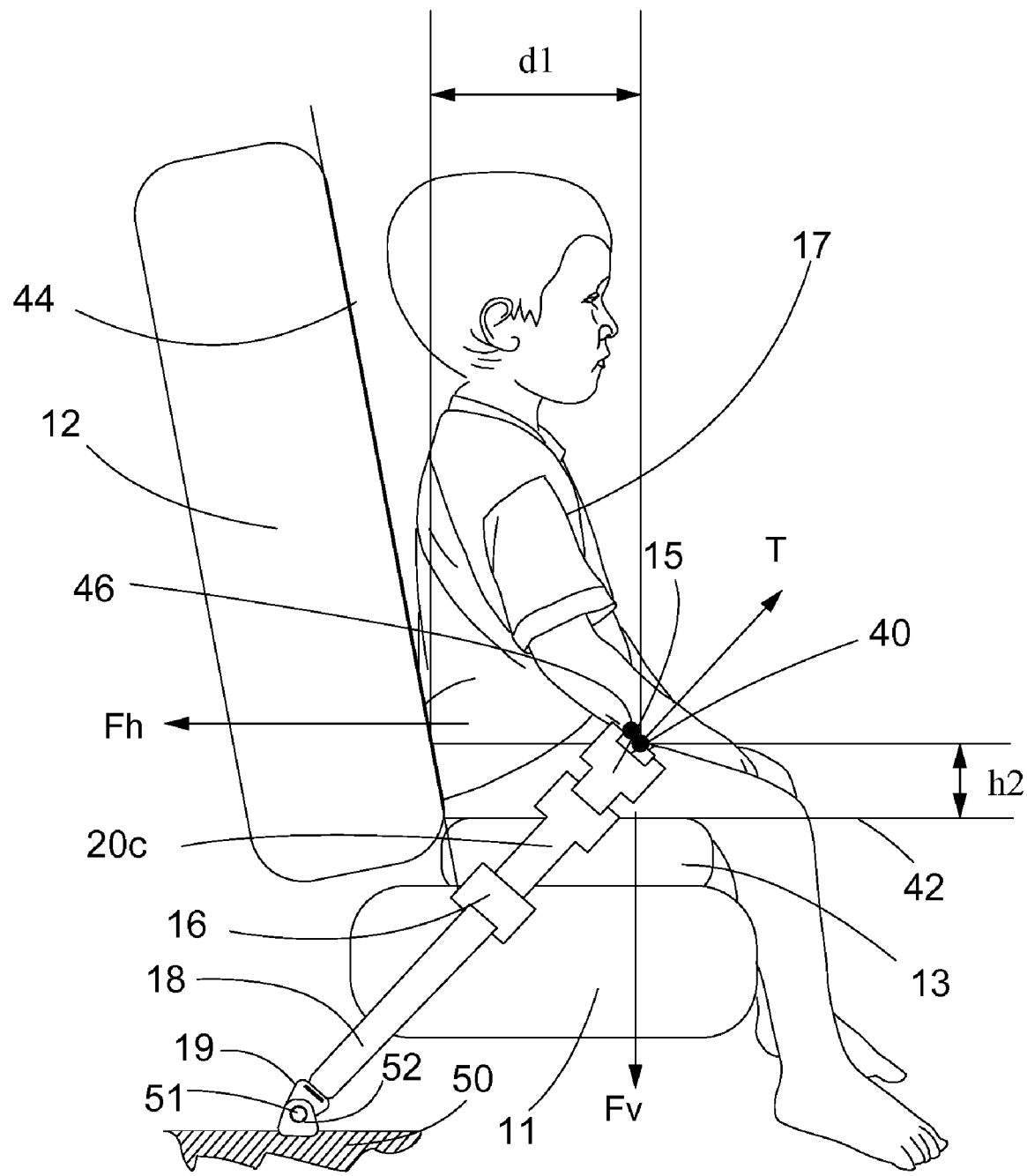
FIG. 3g is a schematic illustration of a preferred embodiment of the present invention depicting a side view showing the seat belt's total equivalent force exertion point, when it is at the intersection point of the upper part of the thigh of a child seated in the child booster safety seat with said child's waist.

FIG. 3g is a schematic illustration of a preferred embodiment of the present invention depicting a side view showing the seat belt's total equivalent force exertion point 40, when it is near the intersection point of the upper part of the thigh of the child seated in the child booster safety seat 13 with said child's waist.

A more optimal utilization of the present invention, with respect to FIGS. 3e and 3f, can be achieved when the geometrical dimensions of rigid seatbelt adaptor 20c enable extension of the integrated system as previously described so that the total equivalent force exertion point 40 is more distant from the vehicle's back seat 11 and the backrest of the vehicle's back seat 12 so that connection and disconnection of latch plate 15 to the rigid seatbelt adaptor 20c is more convenient and safe.

The maximum length allowed in this case is such that the forces exerted on the child in case of emergency braking are downwards and backwards with regard to the vehicle, and this length is achieved when the total equivalent force exertion point 40 is approximately at the point of contact between the upper part of the child's thighs and the front part of his waist 46.

The optional length addition, without exceeding the limitation defined above, with regard to the lengths shown in FIGS. 3e and 3f depends on the relevant dimensions of the child 17 seated strapped into the child booster safety seat 13. One option of setting this length is by selecting a rigid seatbelt adaptor 20c personally adapted to a known specific child 17 seated in a known specific child booster safety seat 13 in a known specific vehicle, similar to the manner of selection of standard personal safety accessories. The choice can also be made from a set of rigid seatbelt adaptors 20c of different lengths at reasonable intervals.

A good method of selection is checking the selected rigid seatbelt adaptor 20c by connecting it to the vehicle's restraining system, buckling the child 17 into the child booster safety seat 13, tugging at the seatbelt's upper segment 14d, and verifying that the lap second segment 14b exerts forces in the necessary directions on the child 17.

Suitable instructions for proper selection of a rigid seatbelt adaptor 20c can be published much in the same way that instructions for use of child safety seats are published by seat manufacturers and vehicle manufacturers. This method selection can also apply to other seatbelt adaptors according to the present invention.

Figure 3H:
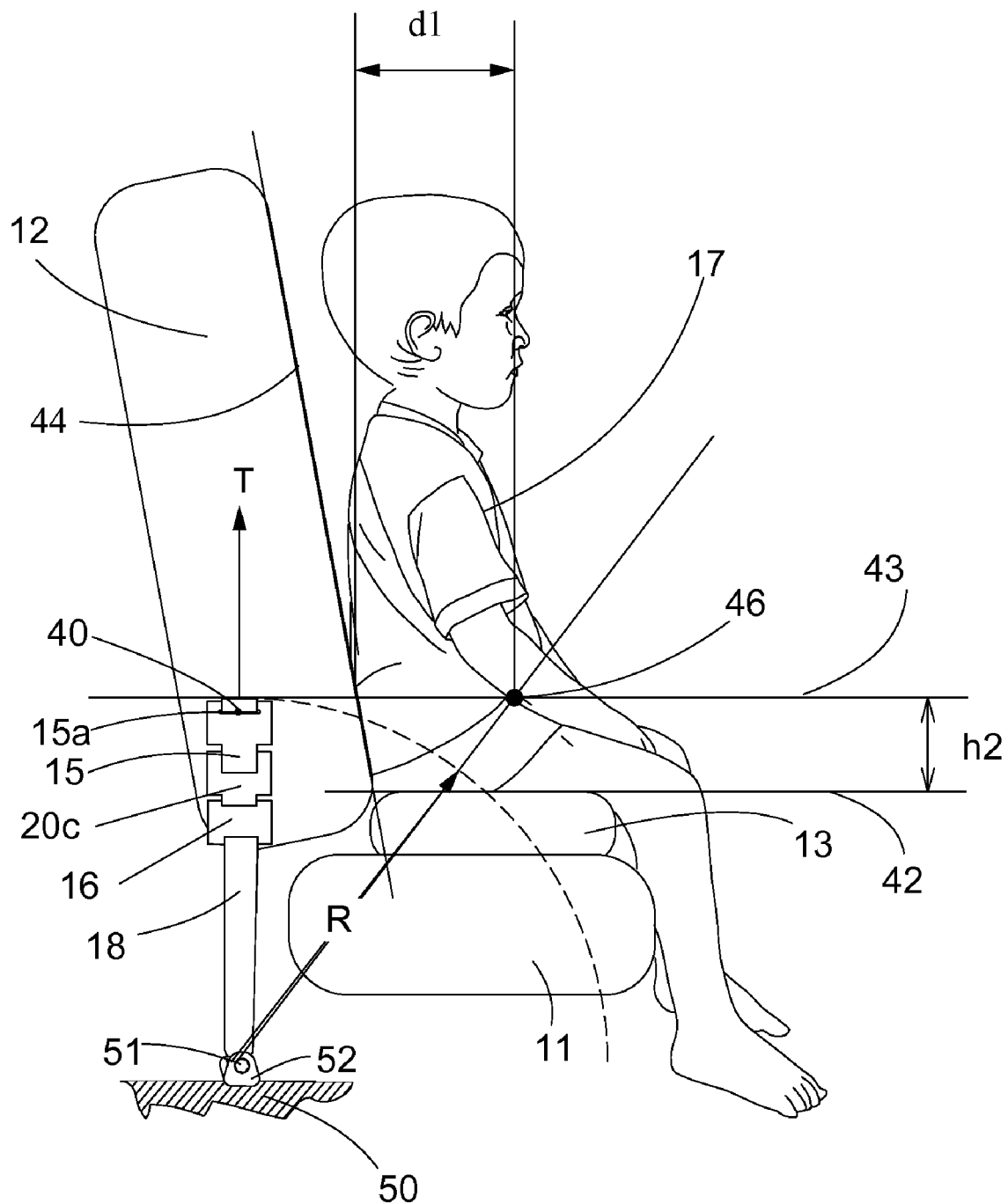
FIG. 3h is a schematic illustration of a preferred embodiment of the present invention depicting a side view showing the seat belt's total equivalent force exertion point, when it is level with a plane parallel to the upper part of the thigh of a child seated in the child booster safety seat, with the force on the latch plate being exerted upwards relative to the vehicle.

FIG. 3h is a schematic illustration of a preferred embodiment of the present invention depicting a side view showing the seat belt's total equivalent force exertion point 40 when it is level with the virtual surface 43, parallel to the upper part of the thigh of the child 17 seated in the child booster safety seat 13, with force T being exerted upwards relative to the vehicle, on latch plate 15 of the vehicle conventional seatbelt restraint system, which is connected to a rigid seatbelt adaptor 20c, connected to buckle 16 of the vehicle conventional seatbelt restraint system, connected to the vehicle's anchoring seatbelt 18 (or any other alternative apparatus installed in the vehicle), whose other end includes a connector 19 (see FIG. 3g), which is connected to the anchoring point 52 connected directly to the vehicle's frame 50.

A rigid seatbelt adaptor 20c can be selected to have a length suitable and safe for any child seated in a child booster safety seat 13, according to safety regulations. Safety instructions for strapping children in booster safety seats in vehicles are published in safety regulations and in publications and recommendations of child booster safety seat manufacturers, vehicle manufacturers, and safety organizations. Perusing these instructions and regulations can teaches that different booster seats have different minimum child weight values for use with the seat, the lowest value at 15 kg, which is the approximate average weight of a three year old child.

Obviously, not every three year old child has the same physical dimension, and there is a distribution of dimensions. (One should also take into account that when force is exerted on a child's body by a seatbelt, there is a certain degree of squashing of the child's soft tissue, however seeing as this tissue is in proximity to the pelvic bone, the squashing is negligible for our concerns.) Therefore, the selection must be according to the dimensions of a child of a minimal weight of 15 kg, or a minimal age of three years, who has reasonable minimal dimensions. Dimension h2, being the vertical gap between the upper surface of the booster safety seat 42 and the virtual surface 43, is the smallest likely size for a three year old child and in any case for any child weighing at least 15 kg, ensures that for every possible disposition of the anchoring point 52, when the child is being strapped into the child booster safety seat 13, the total equivalent force exertion point 40 will be lower than the virtual surface 43, including a safety margin, as shown in the illustration by the arrow of radius R. In this case, slot 15a of the latch plate 15, including the total equivalent force exertion point 40 is horizontal and is all practically level with the virtual surface 43.

Anthropometric research and measurements that we have conducted indicate that the dimensions of the smallest child which can be safely seated in a child booster safety seat include a thigh depth of 6 cm when the child is seated, which is essentially the dimension marked as h2 in the illustration, and an abdominal depth of 12 cm, which is marked as d1 in the illustration.

Figure 4A:
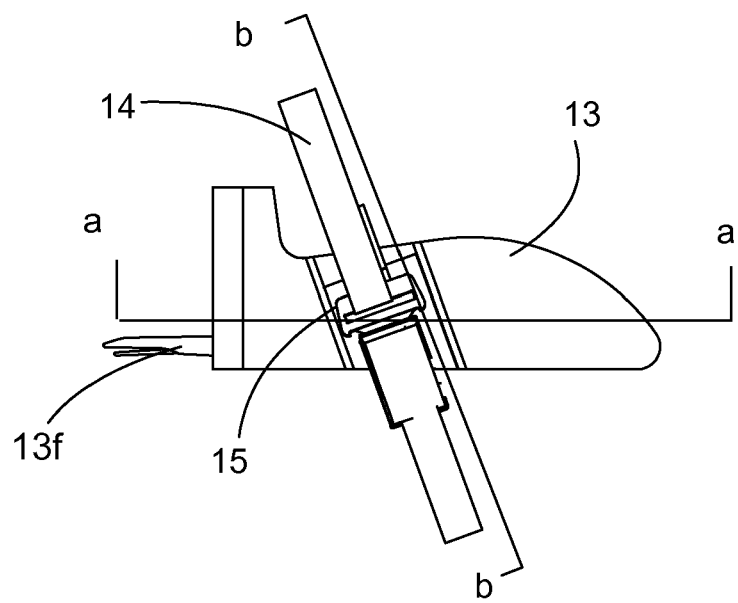
FIG. 4a is a schematic illustration of a preferred embodiment of the present invention depicting a side view of a part of the child restraint system and a child booster safety seat.

FIG. 4a is a schematic illustration of a preferred embodiment of the present invention depicting a side view of a part of the child restraint system and a child booster safety seat 13 whose structure conforms to the restraint system. The illustration shows that the restraint system is in the groove located in the side of the child booster safety seat 13. The material from which the structure of the safety seat is assembled in the area of the grove can be a material, such as rubber, that is suitable for contact with rigid parts, or any other material known to an expert in the field. This material can be suitable for restraining friction forces and blows inflicted by the rigid parts of the restraint system on the child booster safety seat 13. The groove can be in one suitable side of the child booster safety seat 13; there can also be two grooves, one in each suitable side. The material that is suitable for restraining can also be on the possible contact areas of the rigid parts of the restraint system.

The present illustration child booster safety seat 13 equipped with a lower anchors and tethers for children device 13f (LATCH), which is the American terminology for a device for attachment points for child safety seats in vehicles. The present invention is suitable for use with booster seats both equipped a lower anchors and tethers for children device and without.

Figure 4B:
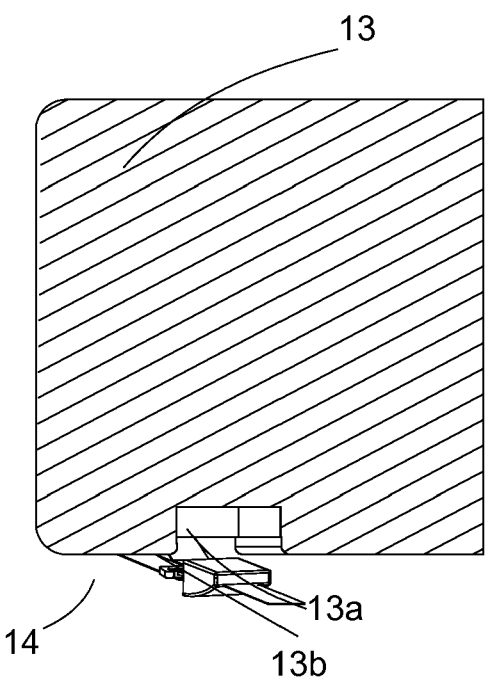

FIG. 4b is a schematic illustration of section a-a of FIG. 4a. The section illustration shows that the structure of the child booster safety seat 13 has a groove with two levels of depth, deep level 13a and less deep level 13b. The restraint system touches the child booster safety seat 13 only in the area of less deep level 13b.

Figure 4C:
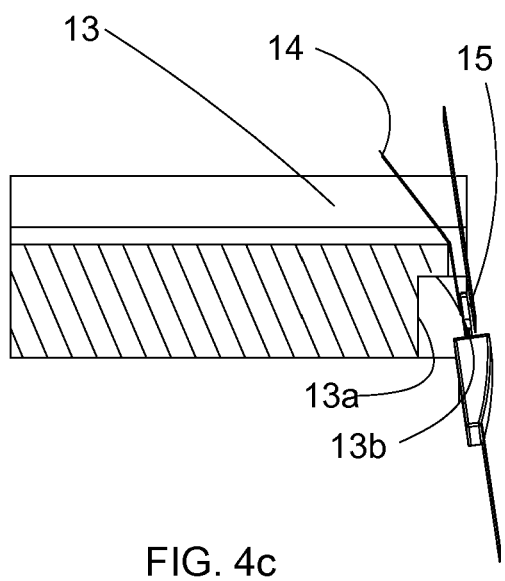

FIG. 4c is a schematic illustration of section b-b of FIG. 4a. The section illustration shows that the structure of child booster safety seat 13 includes a groove with two levels of depth, deep level 13a and less deep level 13b. The restraint system touches the child booster safety seat 13 only in the area of less deep level 13b. This structure of the child booster safety seat 13 causes only a portion of seatbelt 14 to touch child booster safety seat 13 when there is tension force in the restraint system, while the rigid parts, such as latch plate 15 of the vehicle conventional seatbelt restraint system, do not touch the child booster safety seat 13 and do not exert forces on it.

Figure 5A:
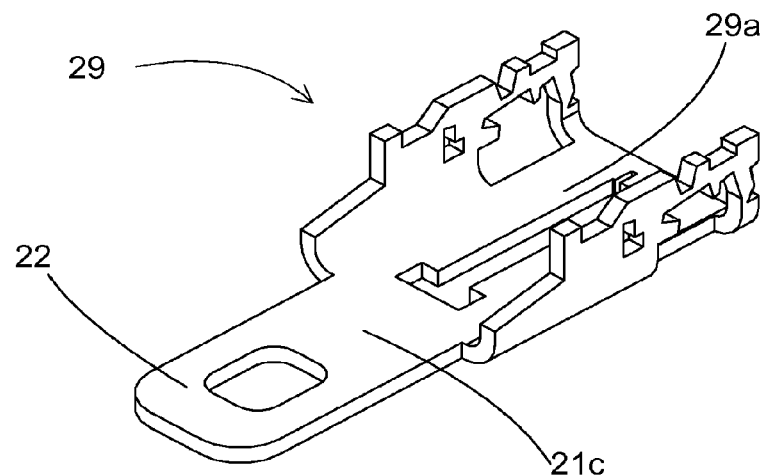
FIG. 5a is a schematic isometric illustration of a preferred embodiment of one rigid part comprising three elements of a rigid seatbelt adaptor.

FIG. 5a is a schematic isometric illustration of a preferred embodiment of rigid part 29 which comprises three elements of a rigid seatbelt adaptor 20c.

A rigid central lengthening device 21c is disposed between an adaptor latch 22 and a mechanism base 29a, while all parts are a single unit and have a bottom side which is a shared bottom plane.

Mechanism base 29a contains a locking and releasing mechanism, not shown in the present illustration, whose description here is strictly schematic and is in no way intended to limit the present invention to any specific type of locking and releasing mechanism.

As shown in the present illustration, there is no clear physical distinction between the mechanism base 29a and the rigid central lengthening device 21c as well as between the rigid central lengthening device 21c and the adaptor latch 22. The distinction between these three elements is according to each one's functionality, when for rigid seatbelt adaptors 20c of different lengths, the rigid central lengthening device 21c is the element that determines the difference in lengths.

Figure 5B:
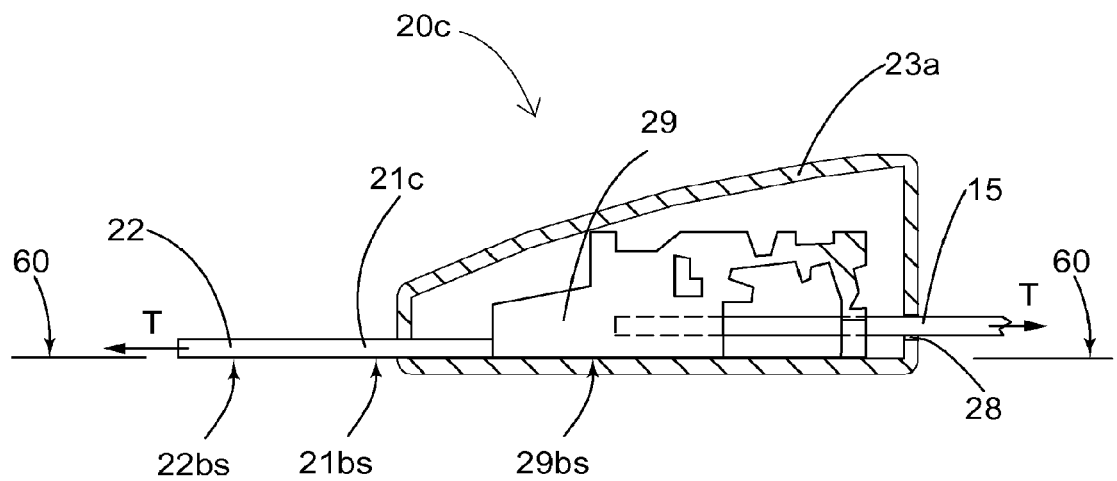
FIG. 5b is a schematic side illustration of a preferred embodiment of a rigid seatbelt adaptor, with a section of an adaptor buckle envelope.

FIG. 5b is a schematic side illustration of a preferred embodiment of a rigid seatbelt adaptor 20c, with a section of adaptor buckle envelope 23a. This view shows the common bottom plane 60 which includes the adaptor latch bottom surface 22bs, the adaptor central lengthening device bottom surface 21bs, and the mechanism base bottom surface 29bs. Furthermore, the present illustration also shows a part of a latch plate 15 of the vehicle conventional seatbelt restraint system. This structure ensures that in case of an emergency, when the seatbelt restraint system exerts tension forces T, they will act in very close approximation on one plane, parallel to plane 60, and the forces exerted upon mechanism base 29a will be practically identical to the forces that would have been exerted upon it without engagement of a rigid seatbelt adaptor 20c in the vehicle conventional seatbelt restraint system. In this state, excessive concentration of bending forces on the adaptor central lengthening device 21c, the adaptor latch 22, and the mechanism base 29a is avoided.

Figure 6A:
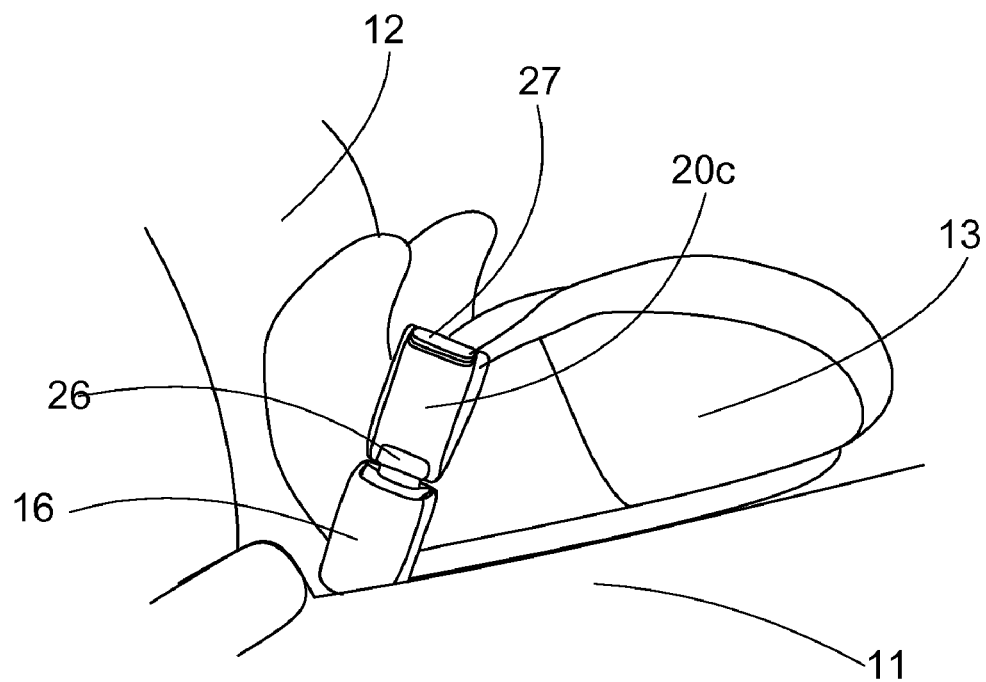
FIG. 6a is a schematic perspective illustration of a preferred embodiment of a rigid seatbelt adaptor attached to a child booster safety seat resting on a back seat of a vehicle.

FIG. 6a is a schematic perspective illustration of a preferred embodiment of a rigid seatbelt adaptor 20c, attached to a child booster safety seat 13 which is resting on a vehicle's back seat 11 in close proximity to the backrest of the vehicle's back seat 12.

When a rigid seatbelt adaptor 20c or any other seatbelt adaptor according to the present invention is engaged with a buckle 16 of the vehicle conventional seatbelt restraint system, however is not connected to a latch plate of the vehicle conventional seatbelt restraint system, it is possible that the rigid seatbelt adaptor 20c will tilt toward the vehicle's back seat 11 and will be hard to reach when buckling the child in the seat. To prevent this from happening, the rigid seatbelt adaptor 20c is attached to the child booster safety seat 13.

This illustration also shows the release button 27 and the indentation 26 of the rigid seatbelt adaptor 20c. This illustration demonstrates how without the presence of the adaptor buckle indentation 26, releasing the rigid seatbelt adaptor 20c from buckle 16 could pose some difficulty.

Figure 6B:
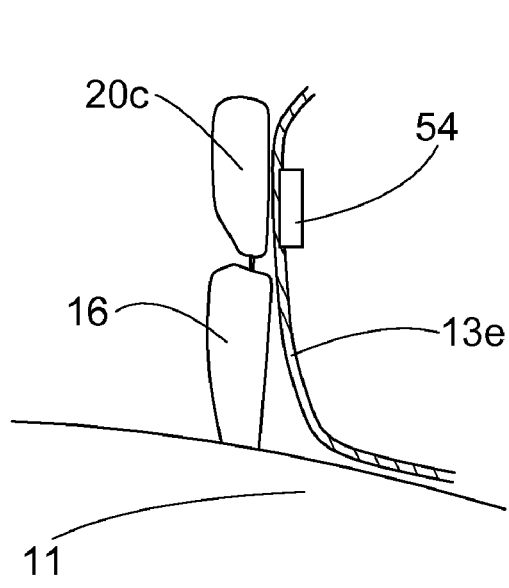
FIGS. 6b and 6c are schematic side view illustrations of a preferred embodiment of a rigid seatbelt adaptor attached to a child booster safety seat.
Figure 6C:
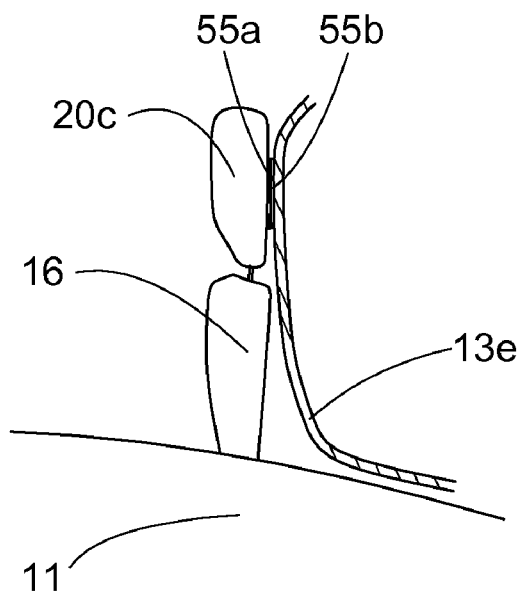

FIGS. 6b and 6c are schematic side view illustrations of a preferred embodiment of a rigid seatbelt adaptor 20c, attached to a child booster safety seat 13 resting on a vehicle's back seat 11. Attachment of the rigid seatbelt adaptor 20c to the child booster safety seat 13 is done by means of a coupling means.

FIG. 6b demonstrates a magnetic coupling means 54. A magnet is fixed to booster seat wall 13e. Its magnetic force is applied to the metal components of rigid seatbelt adaptor 20c, and attaches it to the seat.

FIG. 6c demonstrates a Velcro coupling means, composed of Velcro coupling means first layer 55a and Velcro coupling means second layer 55b. The first layer is fixed to rigid seatbelt adaptor 20c and the second layer is fixed to the external side of booster seat wall 13e.

Note: Velcro is a brand name for a coupling means composed of two fabric layers. One layer typically includes a "hook" side, while the other layer includes a "loop" side.

This attachment can be achieved with any other suitable coupling means, as long as the attachment does not disrupt the orderly function of the seatbelt restraint system, namely does not generate disruptively large forces or any other disruption.

The description given for these illustrations is not strictly limited to use with rigid seatbelt adaptor 20c, and can be applied to any seatbelt adaptor according to the present invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A seatbelt adaptor, for improving a buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to a motor vehicle's back seat near a backrest of the back seat, and wherein the latch plate of the conventional seatbelt restraint system can be comfortably connected and released, enabling safe restraining of a child in normal operation and in case of emergency, and enabling easy and safe release of the child from the child restraint system, the seatbelt adaptor comprising:
    (a) a rigid central lengthening device;
    (b) an adaptor latch plate for attachment and detachment to said buckle of said conventional seatbelt restraint system, said adaptor latch plate being disposed at a first end of said central lengthening device; and
    (c) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, and wherein said adaptor buckle is configured for connecting to said latch plate of said conventional seatbelt restraint system, that secures a child into said child booster safety seat within said motor vehicle, wherein said adaptor buckle includes a mechanism base, having a mechanism base bottom surface, wherein said rigid central lengthening device has a rigid central lengthening device bottom surface, wherein said adaptor latch plate has an adaptor latch bottom surface, wherein said mechanism base, said rigid central lengthening device, and said adaptor latch plate, are made from one piece material, and wherein said mechanism base bottom surface, said rigid central lengthening device bottom surface, and said adaptor latch bottom surface, are lying operatively at one plane.

2. The seatbelt adaptor of claim 1, further comprising:
    (d) an adaptor buckle indentation at a place at one end of said rigid central lengthening device close to an intersection of said rigid central lengthening device and said adaptor buckle; and
    (e) a release button mounted at second end of said rigid central lengthening device.

3. The seatbelt adaptor of claim 2, further comprising:
    (f) a coupling means disposed on said seatbelt adaptor.

4. A system for improving a buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to a motor vehicle's back seat near a backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:
    (a) a child booster safety seat, having an upper surface for the child to sit upon; and
    (b) a seatbelt adaptor, said seatbelt adaptor including:
        (i) a rigid central lengthening device;
        (ii) an adaptor latch plate for attachment and detachment to said buckle of said conventional seatbelt restraint system, said adaptor latch plate disposed at a first end of said central lengthening device; and
        (iii) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, wherein said adaptor buckle is configured for connecting to said latch plate of said conventional seatbelt restraint system, that secures a child into said child booster safety seat within said motor vehicle, wherein a length of said seatbelt adaptor is so dimensioned as to be suited to improve a latching of the buckle of said motor vehicle's conventional seatbelt restraint system, and wherein said adaptor buckle includes a mechanism base, having a mechanism base bottom surface, wherein said rigid central lengthening device has a rigid central lengthening device bottom surface, wherein said adaptor latch plate has an adaptor latch bottom surface, wherein said mechanism base, said rigid central lengthening device, and said adaptor latch plate, are made from one piece material, and wherein said mechanism base bottom surface, said rigid central lengthening device bottom surface, and said adaptor latch bottom surface, are lying operatively at one plane.

5. The system for improving the buckling and unbuckling of a child in a child booster safety seat in a motor vehicle of claim 4 wherein the seatbelt adaptor further comprising:

(iv) a adaptor buckle indentation at a place at one end of said rigid central lengthening device close to an intersection of said rigid central lengthening device and said adaptor buckle; and (v) a release button mounted at second end of said rigid central lengthening device.

6. The system for improving the buckling and unbuckling of a child in a child booster safety seat in a motor vehicle of claim 5 wherein the seatbelt adaptor further comprises:

(vi) a coupling means disposed on said seatbelt adaptor; and (vii) a coupling means disposed on said child booster safety seat, wherein said seatbelt adaptor has a weight value, and wherein said seatbelt adaptor can be detached from said child booster safety seat by a pulling force of a value four times the value of said seatbelt adaptor weight value.

7. The system for improving the buckling and unbuckling of a child in a child booster safety seat in a motor vehicle of claim 6 wherein the child booster safety seat includes:

(i) a lower anchors and tethers for children device.

* * * * *